US007620858B2

(12) United States Patent
Kushnick

(10) Patent No.: US 7,620,858 B2
(45) Date of Patent: Nov. 17, 2009

(54) FABRIC-BASED HIGH SPEED SERIAL CROSSBAR SWITCH FOR ATE

(75) Inventor: Eric Barr Kushnick, Santa Clara, CA (US)

(73) Assignee: Advantest Corporation, Tokyo (JP)

( * ) Notice: Subject to any disclaimer, the term of this patent is extended or adjusted under 35 U.S.C. 154(b) by 303 days.

(21) Appl. No.: 11/482,589

(22) Filed: Jul. 6, 2006

(65) Prior Publication Data
US 2008/0010568 A1      Jan. 10, 2008

(51) Int. Cl.
*G01R 31/28* (2006.01)
(52) U.S. Cl. ...................... 714/716; 714/724
(58) Field of Classification Search ............... 370/503, 370/380, 352; 326/41; 331/16; 714/724, 714/716
See application file for complete search history.

(56) References Cited

U.S. PATENT DOCUMENTS

| | | | | |
|---|---|---|---|---|
| 6,208,667 B1 * | 3/2001 | Caldara et al. | ............... | 370/503 |
| 6,759,869 B1 * | 7/2004 | Young et al. | ................... | 326/41 |
| 7,057,413 B1 * | 6/2006 | Young et al. | ................... | 326/41 |
| 7,193,994 B1 * | 3/2007 | Payson | ....................... | 370/380 |
| 2004/0125792 A1 * | 7/2004 | Bradbury et al. | ............ | 370/352 |
| 2005/0114550 A1 | 5/2005 | Kushnick | | |
| 2007/0080752 A1 * | 4/2007 | Smith | .......................... | 331/16 |

FOREIGN PATENT DOCUMENTS

| | | |
|---|---|---|
| EP | 1 283 615 | 2/2003 |
| JP | 2006-025114 A | 1/2006 |
| WO | WO 2008/004693 A2 | 1/2008 |

OTHER PUBLICATIONS

Gavardoni, M. (Sep. 30, 2003). "Data Flow Within an Open Architecture Tester," Paper 8.3, ITC International Test Conference, *IEEE* 1:185-190.
International Search Report mailed Jan. 17, 2008, for PCT Application No. PCT/JP2007/063634, filed Jul. 6, 2006, four pages.
Written Opinion mailed Jan. 6, 2009, for PCT Application No. PCT/JP2007/063634, filed Jul. 6, 2006, six pages.

* cited by examiner

*Primary Examiner*—David Ton
(74) *Attorney, Agent, or Firm*—Morrison & Foerster LLP

(57) ABSTRACT

A loopback module is disclosed in which N differential High Speed Serial (HSS) digital data input channels are received and sent to a serial to parallel converter, whose output is M-bit wide parallel data. By doing so, the effective data rate is divided down by M to 1/M "fabric" speeds. If the channels contain an embedded clock, the clock is extracted. The parallel data is then sent to a non-blocking crossbar switch, which is able to route any of the N M-bit parallel data inputs to any of Q parallel data outputs by effectively utilizing one multiplexer for each parallel output. Each parallel data output of the crossbar is sent to a parallel to serial converter, whose output is a high speed serial output. Each high speed serial output is fed into a jitter generator circuit, and then to an output driver.

32 Claims, 6 Drawing Sheets

FABRIC-BASED HIGH SPEED SERIAL CROSSBAR SWITCH FOR ATE

FIELD OF THE INVENTION

This invention relates to a test system for testing semiconductor devices such as Integrated Circuits (ICs), and more particularly in one embodiment, to the testing of High Speed Serial (HSS) inputs and outputs of a Device Under Test (DUT) by converting them to lower speed parallel signals and providing a path that allows an output to be selectively looped back to one or more inputs.

BACKGROUND OF THE INVENTION

Increases in IC speed have resulted in a new class of ICs with HSS inputs and outputs. These HSS inputs and outputs currently operate at speeds of 622 Mbits/sec to 2-6 Gbits/sec, and next generation HSS inputs and outputs may reach speeds of 10-13 Gbits/sec. There are at least two different types of interfaces requiring HSS inputs and outputs. One type of interface is for communications, where a HSS differential input/output pair is referred to as a "lane," and wherein a clock might be embedded in the signal. The second type of interface requiring HSS inputs and outputs is found in memory devices communicating with a processor through a HSS memory interface. These memory interfaces may include a forwarded clock that is sent separate from, but along with, the data being transmitted.

As shown in the simplified exemplary stressed eye pattern 100 of FIG. 1, as the amount of jitter present in a HSS signal increases, a HSS data transition 102 may change (i.e. move left or right in time) and the eye 104 may begin to close. In addition, the eye 104 may also begin to close depending on the high or low voltage levels 106 and 108, respectively, of the HSS signal. Note that the eye 104 might have a width of as little as 150-500 picoseconds, so it doesn't take much jitter or other limitations to the bandwidth of the transmission medium to cause a device to have difficulty receiving the HSS signal. Circuitry is therefore often built into the transmit and receive circuitry of HSS interfaces to improve data transmission and reception. Pre-emphasis circuitry is normally used in the transmit circuit to boost signal levels, and equalization is used in the receive circuit to open up the eye and ensure that data can be received.

It is desirable to test the characteristics of the HSS interfaces on Automatic Test Equipment (ATE). Such tests are designed to determine whether these HSS interfaces are working properly—not necessarily to verify the data that is passing through, but rather that the interface circuitry in each HSS interface can detect and process data transitions even at the limits of jitter and voltage level requirements.

For example, as illustrated in FIG. 2a, by injecting data-dependent jitter or changing the high or low voltage levels (see reference character 200) of a HSS signal 202 generated within the ATE 204 and destined for a HSS input 206 of a DUT 208, the eye of the input signal can be closed up to a certain extent, and it can be determined whether the receiver in the HSS input is capable of receiving the data being sent even with the degraded input signal. Although in one embodiment of the present invention, detection logic 238 in the DUT 208 is able to detect if the signal was received properly, in another embodiment the DUT then sends the received HSS signal 202 back to the ATE 204 on line 226. In the latter case, the ATE 204 then detects the serial bit stream and compares it to the generated bit stream at device speeds using detection logic 228 to determine if the signals were received and properly transmitted back to the ATE by the DUT 208.

One way to generate HSS test signals is by using a Linear Feedback Shift Register (LFSR) 222 to generate a Pseudo Random Bit Stream (PRBS) 224 which is then sent to the DUT 208. Note that the LFSR 222 of FIG. 2a is merely symbolic, and does not represent an actual digital circuit. Actual LFSRs, not shown in FIG. 2a, are well-understood by those skilled in the art. The DUT 208 then generates a HSS output 226 based on the received PRBS 224. LFSRs 222 are advantageous because they provide a simple means to generate a serial bit stream, and provide enough data transitions to enable the ATE 204 to recover the embedded clock (if any) from the data stream and test for data-dependent jitter. Another type of signal that can test data-dependent jitter is the IEEE 802.3ae compliant Continuous Jitter test pattern (CJ-pat), which is designed to exercise clock recovery circuits and get as much data-dependent jitter out of a short waveform as possible. Signals read from memory can also be used to test data-dependent jitter.

As illustrated in the example of FIG. 2b, conventional ATE systems 210 may also test HSS signals by providing a path that allows a HSS output 212 from the DUT 214 (generated using a LFSR or other logic 230) to be selectively switched or looped back to a single HSS input 216 of the DUT. This is often called loopback. These loopback tests are designed to simulate various levels of jitter and voltage levels, so that when the DUT 214 generates a signal 218 that is received into the ATE 210, the signal is sent back out to the DUT with some added jitter or changed voltage levels (see reference character 220) to stress the receiver of the HSS input 216 and determine whether it is working properly. The DUT 214 receives the loopback signal and performs comparisons (see reference character 232) to determine if the signals were transmitted and received properly by the DUT. Note that testing at device speeds limits the type of circuits that can be used to implement the loopback circuitry. The transmitter of a HSS output 212 can also be tested in a limited manner in the ATE 210 by measuring the voltage levels coming out of the transmitter, and measuring current and output jitter at Direct Current (DC) voltage levels.

It is desirable in the loopback configuration of FIG. 2b to have the capability to loop back any HSS output from the DUT 214 to any HSS input of the DUT. Conventional mechanisms for doing this utilize analog or high speed digital switches 234. However, analog switching presents loading problems as the signals are passed through multiple relays, and output driving problems if a single signal is to be routed to multiple DUT inputs. High speed digital solutions require complex, special purpose, high speed circuitry. In either case, a switching network to switch these signals directly requires a large bandwidth and is very costly. In addition, such loopback configurations are only capable of looping back a single DUT HSS output to a single DUT HSS input.

Note that one alternative to the loopback circuitry of FIG. 2b is a single wire. However, single wire loopback circuits do not allow for the test signal to be applied to a selectable HSS input or multiple HSS inputs, do not allow for jitter or signal levels to be adjusted (i.e. they are limited by any adjustments that can be made by the transmitter of the DUT), and also require more Built-In Self Test (BIST) capabilities in the DUT.

Therefore, there is a need for loopback circuitry that is capable of connecting a DUT HSS output to multiple DUT HSS inputs, and doing so at lower speeds to enable its implementation in a wider variety of lower cost devices with reduced pin counts.

SUMMARY OF THE INVENTION

The present invention is directed to a loopback module that utilizes fabric-based switching to loop back one DUT output HSS signal to one or multiple DUT input HSS signals while reducing or eliminating signal degradations due to variable loading, path length variations and bandwidth reductions on the signals. In addition, embodiments of the present invention provide the ability to connect and switch in memory or other devices to provide data to the DUT input HSS signals using the fabric-based switch, and utilize a parallel rather than serial (i.e. more expensive) PRBS generator/receiver.

In the loopback module of the present invention, each of N differential HSS digital data input channels, each one lane wide and transmitted at a particular data rate, is received and sent to a serial to parallel converter, whose output is an M-bit wide parallel input. By doing so, the effective data rate is reduced or divided down by M to 1/M "fabric" speeds. If the differential HSS digital data input channels contain an embedded clock, the channels are received into clock/data recovery circuits before being sent to the serial to parallel converters to extract the clock embedded in the data, along with the serial data itself.

The M-bit wide parallel input is then sent to a non-blocking crossbar switch, which is able to route any of the N M-bit wide parallel inputs to any of Q M-bit wide parallel outputs by effectively utilizing one multiplexer for each parallel output data. Memory can also be connected to the crossbar switch, and parallel data to/from the memory can be transferred from/to the switch at fabric speeds. The memory data can then be switched in crossbar fashion to any channel or combination of channels, and be reconstructed as HSS data, or HSS data from a HSS digital data input channel can be stored in parallel fashion in the memory.

Each parallel output data of the crossbar is sent to a parallel to serial converter, whose output is a high speed serial output representing the regeneration of a HSS digital data input channel, or HSS digital data from another source such as the memory. Each high speed serial output is fed into a jitter generator circuit, and then to an output driver. In addition, an optional First In First Out buffer (FIFO) may be placed on the parallel inputs or parallel outputs of the crossbar switch to temporarily store data when input/output speed mismatches are introduced. A parallel PRBS generator may also be switched in crossbar fashion to any channel or combination of channels to enable PRBS data to be generated and forced onto the parallel outputs.

In other embodiments, a processor or pattern generator (an engine that operates sequentially on pattern instructions at lower clock speeds) could optionally be connected to the crossbar switch and switched in crossbar fashion to any channel or combination of channels to provide data on parallel outputs. In addition, the processor could be employed as a control engine to write to control registers and configure the loopback module and the crossbar switch in the same way that a processor is used to configure a digital pin in a tester.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Embodiments of the present invention are directed to a loopback module that utilizes fabric-based switching to loop back one DUT output HSS signal to one or multiple DUT input HSS signals while reducing or eliminating signal degradations due to variable loading, path length variations and bandwidth reductions on the signals. In addition, embodiments of the present invention provide the ability to connect and switch in memory or other devices to provide data to the DUT input HSS signals using the fabric-based switch, and utilize a parallel rather than serial (i.e. more expensive) PRBS generator/receiver.

Figure 1:
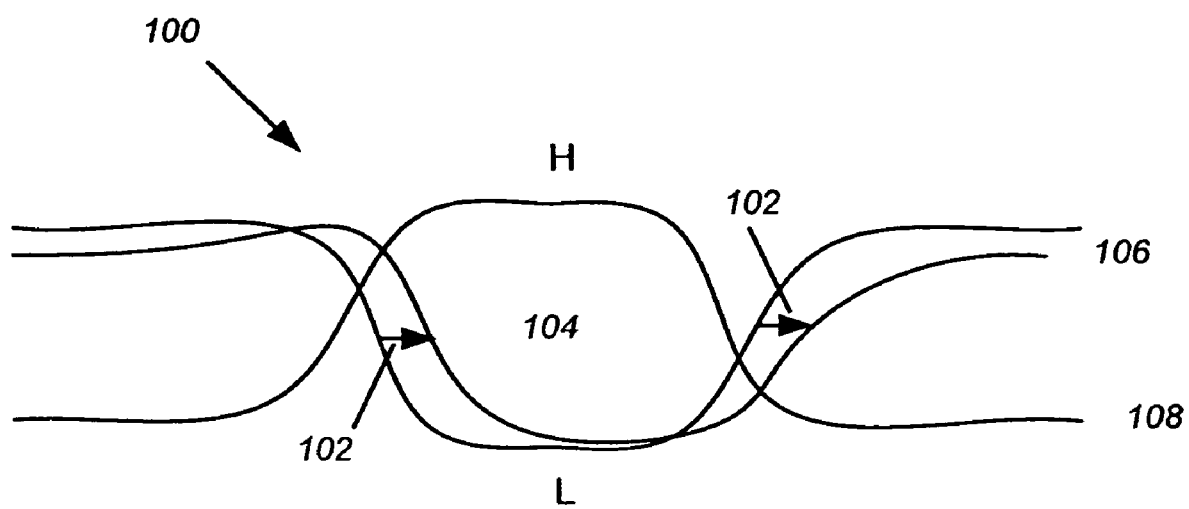
FIG. 1 illustrates an exemplary stressed eye pattern.
Figure 2B:
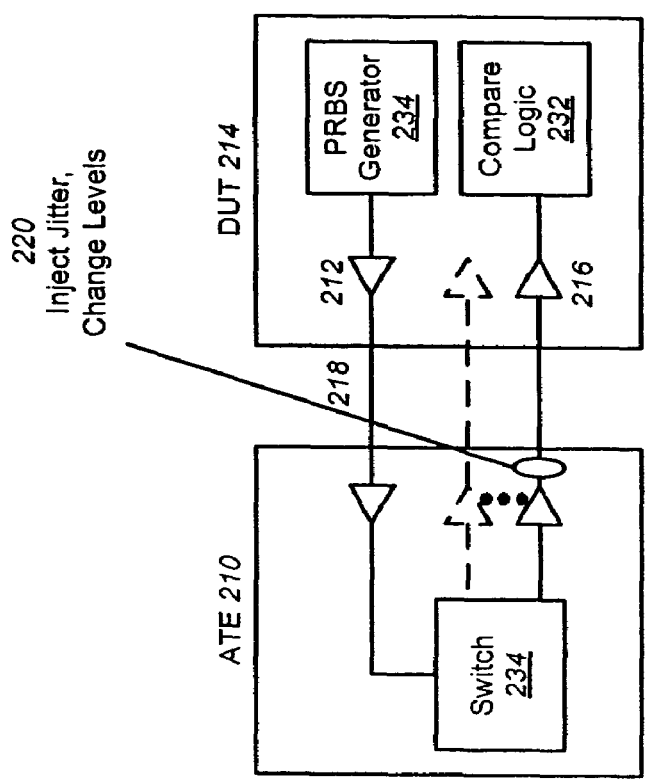
FIG. 2b illustrates another exemplary ATE test configuration in which a HSS output from the DUT is sent to the ATE, where it is selectively looped back to a HSS input of the DUT.
Figure 2A:
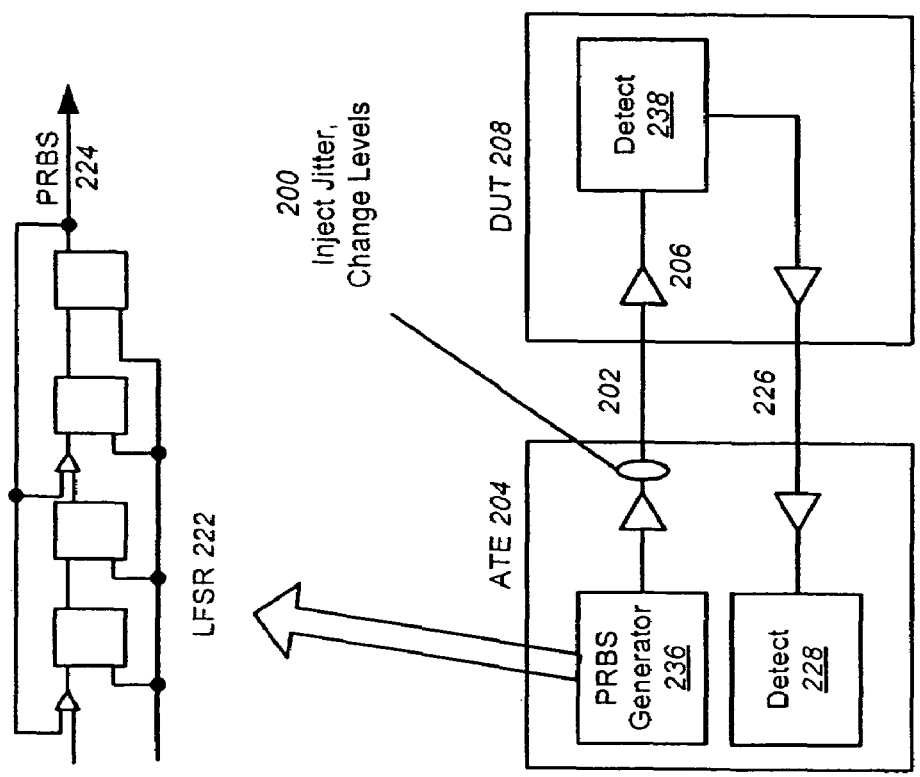
FIG. 2a illustrates an exemplary ATE test configuration in which the ATE generates HSS test signals using a LFSR to generate a PRBS which is then sent to the DUT.
Figure 3:
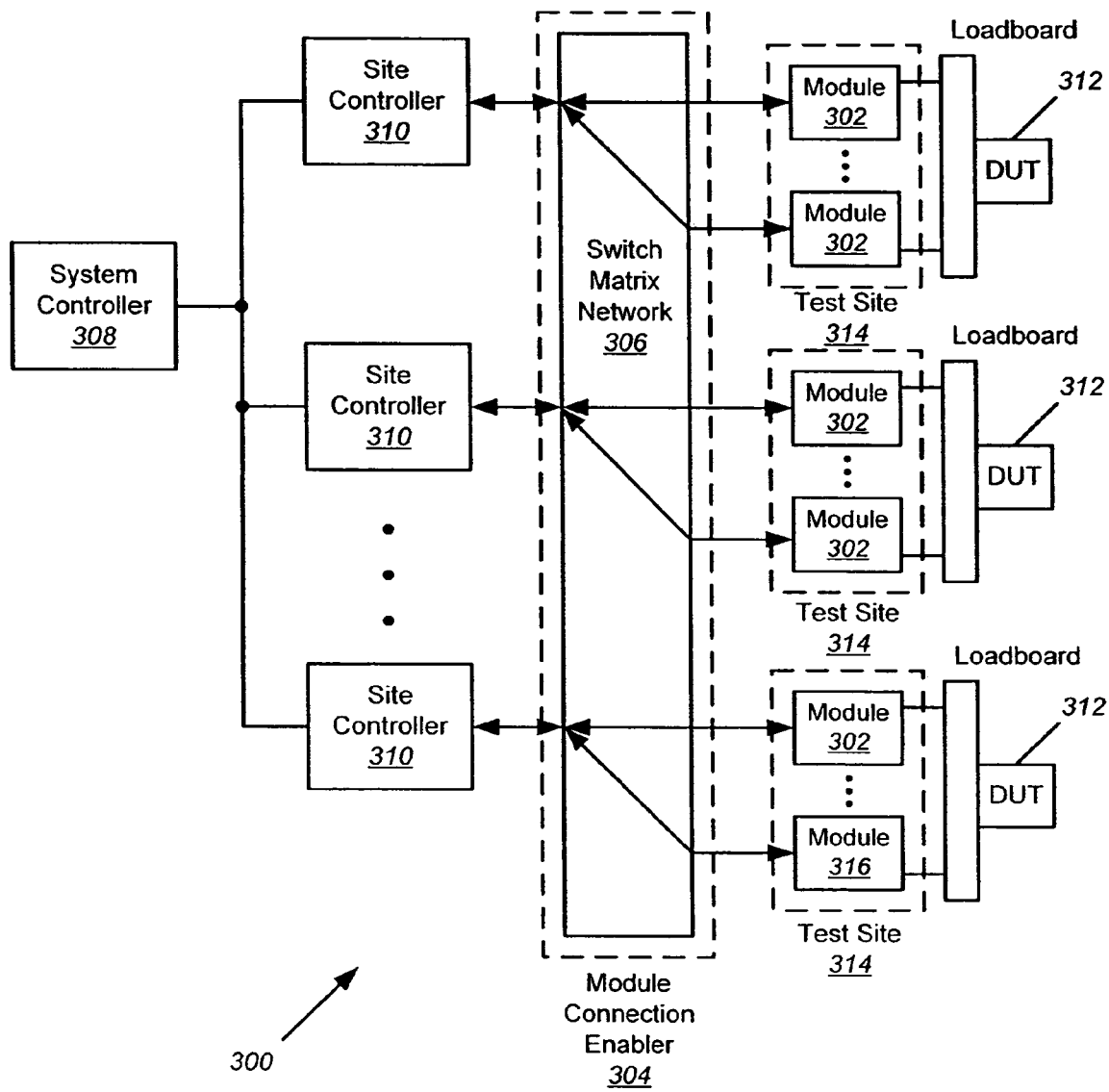
FIG. 3 illustrates an exemplary test system incorporating a loopback module according to embodiments of the present invention.

A high-level block diagram of an exemplary test system 300 capable of incorporating embodiments of the present invention is illustrated in FIG. 3. In FIG. 3, the modules 302 may be functional units such as a digital pincard, an analog card, a Device Power Supply (DPS), Arbitrary Waveform Generator (AWG), or a loopback module 316 according to embodiments of the present invention. The physical connections to the modules 302 and 316 may be obtained through a module connection enabler 304 that includes a switch matrix network 306. The switch matrix network 306 may include logic, traces, and pins. The system controller 308 is typically the point of interaction for a user. The system controller 308 provides a gateway to the site controllers 310 and synchronization of the site controllers 310 in a multi-site/multi-DUT environment. The system controller 308 and multiple site controllers 310 may operate in a master-slave configuration. The system controller 308 controls the overall system operation and determines that functions that a particular site controller 310 should perform. Each site controller 310 is itself sufficient to test a DUT 312. The site controller 310 controls and monitors the operation of various modules 302 and 316 within a test site 314. A test site 314 is a collection of modules that service the testing of a single DUT 312. A site controller 310 can control one or multiple test sites 314.

The overall platform consists of a hardware and software framework that provides interfaces through which various hardware and software modules can be employed. The architecture is a modularized system with module control software and a communication library that allows module-to-module, site controller to module, site controller-to-site controller, and system controller to site controller communication.

The loopback module 316 advantageously provides the test system 300 with a cost-effective and flexible capability to test DUTs with multiple HSS inputs and outputs by looping back any one of the HSS outputs to one or multiple HSS inputs.

Figure 4:
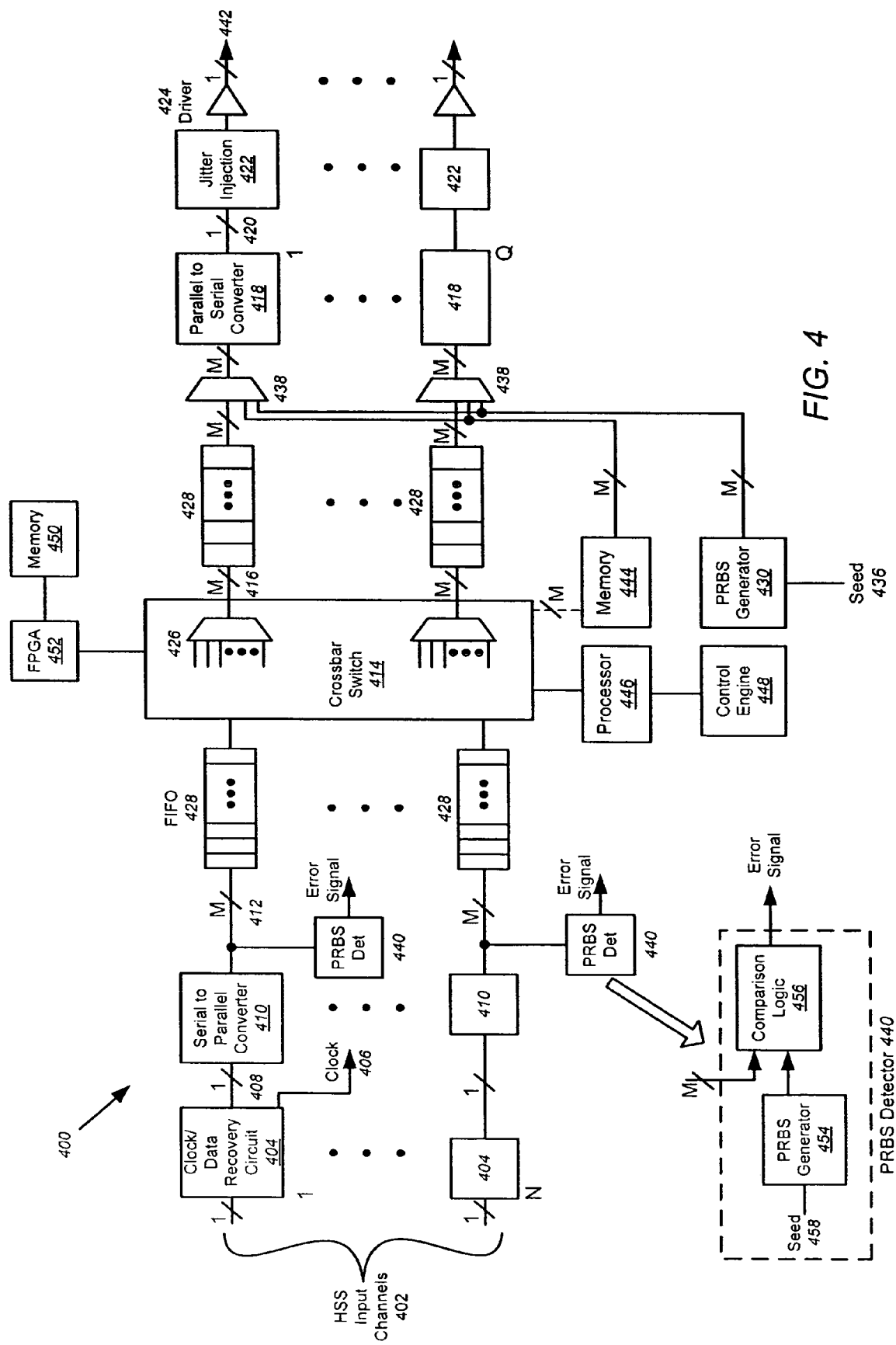
FIG. 4 illustrates a block diagram of an exemplary loopback module according to embodiments of the present invention.

FIG. 4 illustrates a block diagram of an exemplary loopback module 400 according to embodiments of the present invention. In FIG. 4, each of N (e.g. 16) differential HSS digital data input channels 402, each one lane wide and transmitted at a particular data rate (e.g. 6.4 Gbits/sec), are sent to a serial to parallel converter 410, which generates an M-bit wide parallel input 412 (e.g. 40 bits wide) from M sequential serial bits of the input channel 402. By doing so, the effective data rate is reduced or divided down by M (e.g. divided by 40) to 1/M "fabric" speeds (e.g. 160 MHz, which is $1/40^{th}$ of 6.4 Gbits/sec). Logic operating at these fabric speeds can advantageously be implemented in relatively inexpensive standard digital logic such as a Field Programmable Gate Array (FPGA). If the differential HSS digital data input channels 402 contain an embedded clock, the channels are received into clock/data recovery circuits 404 before being sent to the serial to parallel converters 410. Each clock/data recovery circuit 404 extracts a clock 406 (e.g. 6.4 GHz) embedded in the data, along with the serial data itself 408 at a particular rate (e.g. 6.4 Gbits/sec).

Note that if the serial to parallel and parallel to serial conversions could not be handled within an FPGA due to speed limitations of the FPGA, and as a result had to be performed in discrete circuitry outside the FPGA, many FPGA Input/Outputs (I/Os) would be required to receive the parallel data into the FPGA. However, FPGA speeds have now improved to the point where they can handle the serial to parallel conversion at the full device or clock rate (e.g. 6.4 Gbits/sec).

Each M-bit wide parallel input 412 is then sent to a non-blocking crossbar switch 414, which is able to route any of the N M-bit wide parallel inputs 412 to any of Q (e.g. 16) M-bit wide parallel outputs 416 through the appropriate use of registers and multiplexers. The crossbar switch 414 effectively includes a multiplexer 426 (e.g. a 40-bit wide 16:1 multiplexer) for each parallel output 416. This is especially useful in DUTs having a particular serial test output port intended to be switched into a number of DUT inputs. The present invention allows for any number of the DUT inputs to receive the test output.

There are several advantages to this switching approach. A HSS digital data input channel 402 can be routed simultaneously to more than one output 416 without developing loading problems. Particularly in this case, there are no switch-setting dependent loading effects on the HSS digital data input channel 402. Also, because the crossbar switch 414 operates at fabric speeds, the crossbar switch can be implemented in relatively inexpensive standard digital logic such as an FPGA. Note that without the conversion to fabric speeds, expensive high speed digital switches or expensive and bandwidth and fanout-prohibitive high speed analog switching would have to be employed.

Each M-bit wide parallel output 416 of the crossbar switch 414 is sent to a multiplexer 438 through an optional First In First Out buffer (FIFO) 428. The FIFO 428 may be placed on the parallel inputs 412 or parallel outputs 416 of the crossbar switch 414 (preferably in the lower "fabric" speed domain) to temporarily store data when input/output speed mismatches are introduced. For example, a speed mismatch of 100 ppm in frequency may be introduced to test the DUT's capability to handle slight frequency differences.

A memory 444 may also be employed to store parallel data and send the parallel data to multiplexer 438. In addition, HSS data from a HSS digital data input channel 402 can be converted to parallel data, routed through the crossbar 313, and stored in parallel fashion into the memory 444 at fabric speeds.

A parallel PRBS generator 430 may also be employed to generate M-bit wide parallel PRBS data to be sent to multiplexer 438. In a parallel PRBS generator 430, which is a device well-understood by those skilled in the art, the M-bit parallel equivalent of a high speed LFSR output waveform is computed at each low speed (fabric rate) clock cycle (as opposed to computing those same M bits serially at the high speed serial clock rate). In the parallel PRBS generator 430, an LFSR with particular feedback taps (the particular feedback taps being chosen to represent a particular Boolean algebra equation) generates a bit stream that has a maximum length of $2^n-1$, where n is the number of stages in the LFSR. This bit stream continuously repeats as the LFSR is clocked. A starting point in the $2^n-1$ cyclical bit stream can be established by pre-loading the appropriate ones and zeros in the LFSR registers (flip-flops) as a seed. A standard seed 436 can be used to ensure that the PRBS generator 430 always starts at the same place.

Depending on how multiplexer 438 is switched, parallel to serial converter 418 will receive either the M-bit wide parallel output 416, an M-bit wide parallel output from memory 444, or an M-bit wide parallel output from PRBS generator 430. The output of the parallel to serial converter 418 is a HSS output 420. Each HSS output 420 is fed into a jitter generator circuit 422, and then to an output driver 424 (which may then send the signal to a HSS input of the DUT).

Each M-bit wide parallel input 412 is also sent to a PRBS detector 440, which includes a PRBS generator 454 as described above and comparison logic 456. The purpose of the PRBS detector 440 is to detect errors in the received M-bit wide parallel input 412. This is accomplished by comparing the received M-bit wide parallel input 412 with a PRBS generated in the PRBS generator 454. However, before this comparison can be made by comparison logic 456, the PRBS generator 454 must be aligned to the same point in its $2^n-1$ cyclical pattern that the received M-bit wide parallel input 412 is at. This is accomplished by choosing the last M bits of the received data as a seed 458, and then generating the next M bits with the PRBS generator 454 and comparing them to the next 40 bits of received data on the M-bit wide parallel input 412. As the PRBS generator 454 continues to run, this comparison is made on an ongoing basis to the received data. The seed 458 is only entered into the PRBS generator 454 once, just before the first compare cycle.

In other embodiments, a processor or pattern generator 446 (an engine that operates sequentially on pattern instructions at lower clock speeds) could optionally be applied to multiplexer 438 or connected to the crossbar switch 414 and switched in crossbar fashion to any channel or combination of channels to provide data on parallel outputs 416. In addition, the processor 446 could be employed in communication with a control engine 448 to write to control registers and configure the loopback module 400 and the crossbar switch 414 in the same way that a processor is used to configure a digital pin in a tester.

In still further embodiments in which the loopback module 400 is contained within a single FPGA (except for the jitter generator circuits 422 and drivers 424), an external memory 450 and external FPGA 452 could optionally be connected to the crossbar switch 414 and switched in crossbar fashion to any channel or combination of channels to provide data on parallel outputs 416, or to store input data received into the main FPGA.

Figure 5:
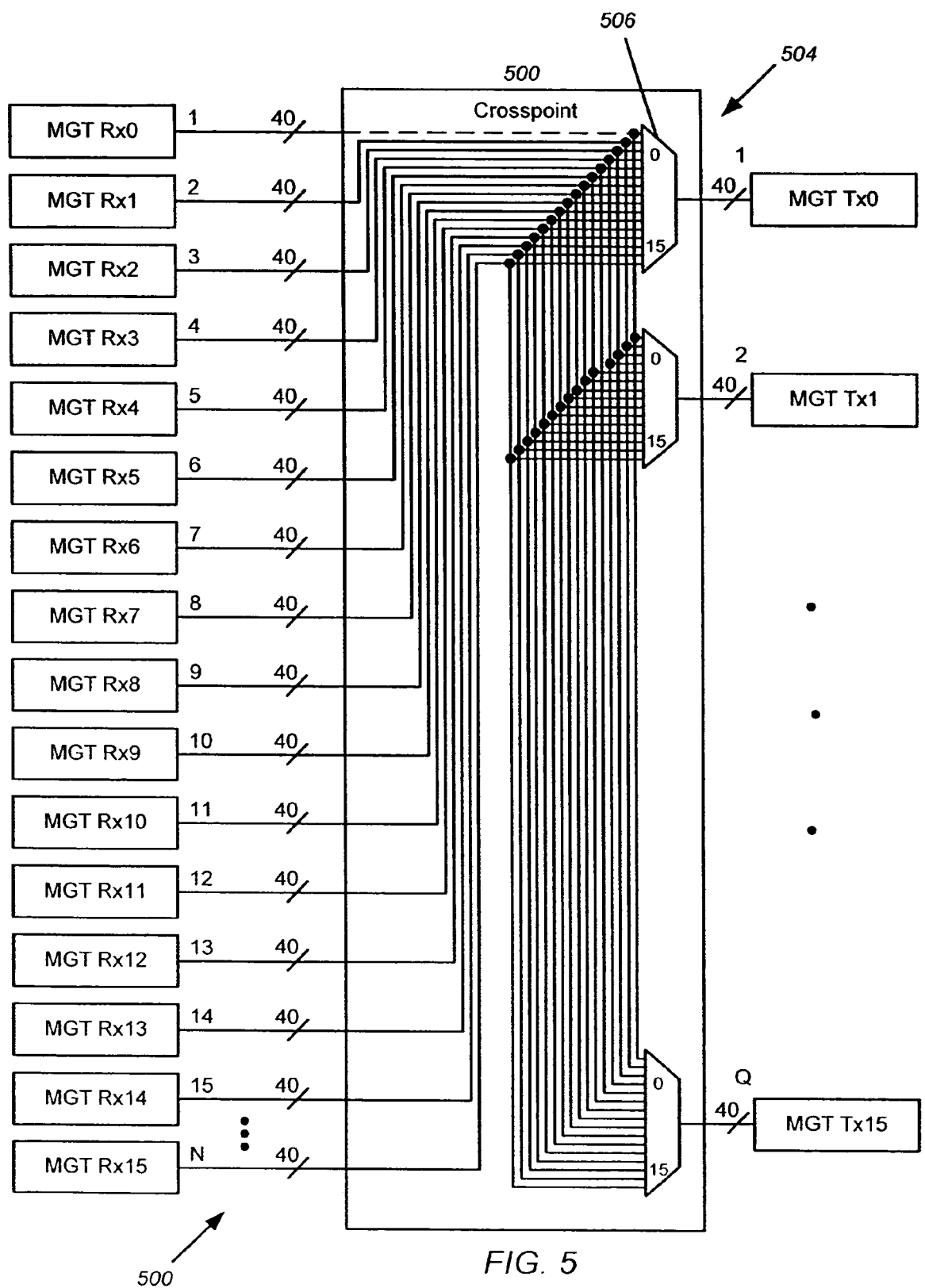
FIG. 5 illustrates a logic diagram of an exemplary non-blocking crossbar switch according to embodiments of the present invention.

FIG. 5 illustrates a logic diagram of an exemplary non-blocking crossbar switch 500 according to embodiments of the present invention described above, which is able to route any of the N M-bit parallel input data 502 to any of Q (e.g. 16) parallel output data 504 through the appropriate use of registers and multiplexers. The crossbar switch 500 effectively includes a multiplexer 506 (e.g. a 40-bit wide 16:1 multiplexer) for each parallel output 504.

Figure 6:
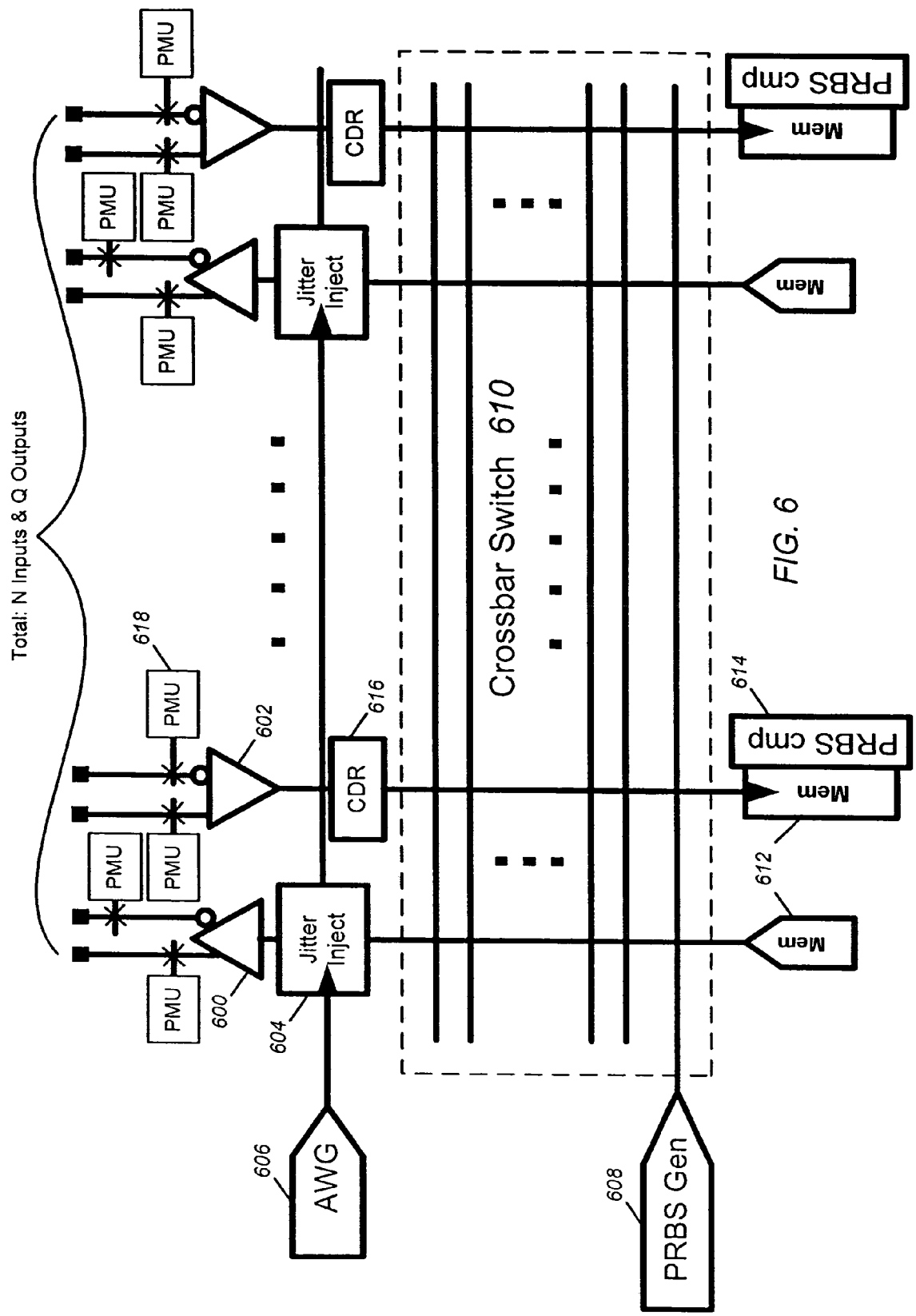
FIG. 6 illustrates a block diagram of a crossbar switch and differential driver and receiver circuits for the inputs and outputs of the loopback module according to embodiments of the present invention.

FIG. 6 illustrates a block diagram of a crossbar switch and differential driver and receiver circuits for the inputs and outputs of the loopback module according to embodiments of the present invention described above. In FIG. 6, differential driver and receiver pairs 600 and 602, respectively, provide the interfaces to the loopback module. A Precision Measurement Unit (PMU) 618 may be coupled to each signal of each differential pair to measure the characteristics of each signal. A jitter injection circuit 604 is present on each output, and may be fed by an AWG 606. A Clock Data Recovery (CDR) circuit 616 (which normally recovers the embedded clock from an input signal that has an embedded clock) cleans up jitter present on received signals. A PRBS generator 608 is coupled into the crossbar switch 610. Additionally, memory 612 is coupled to every driver 600 and receiver 602, and a PRBS comparator (a PRBS detector which contains both a PRBS generator and a comparison circuit) 614 is also coupled to every receiver.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A loopback module for testing a Device Under Test (DUT), comprising:
   one or more serial to parallel converters, each serial to parallel converter for receiving a High Speed Serial (HSS) input and converting M sequential serial bits of the HSS input into an M-bit wide parallel input;
   one or more parallel to serial converters, each parallel to serial converter for receiving an M-bit wide parallel output and converting the M-bit wide parallel output to M sequential serial bits of an HSS output; and
   a crossbar switch coupled between the one or more serial to parallel converters and the one or more parallel to serial converters for routing a plurality of M-bit wide parallel inputs to an M-bit wide parallel output.

2. The loopback module as recited in claim 1, further comprising a jitter generator circuit coupled to one or more of the HSS outputs for injecting jitter into the HSS outputs.

3. The loopback module as recited in claim 1, further comprising a memory coupled to the crossbar switch, the crossbar switch for switching M-bit wide parallel memory data from the memory onto one or more of the M-bit wide parallel outputs, or storing an M-bit wide parallel input into the memory.

4. The loopback module as recited in claim 1, further comprising a parallel Pseudo Random Bit Stream (PRBS) generator coupled to the crossbar switch, the crossbar switch for switching M-bit wide parallel PRBS data from the PRBS generator onto one or more of the M-bit wide parallel outputs.

5. The loopback module as recited in claim 4, further comprising an M-bit wide seed input coupled to the PRBS generator for starting the PRBS generator at a known time.

6. The loopback module as recited in claim 1, further comprising a processor coupled to the crossbar switch, the crossbar switch for switching M-bit wide parallel processor data from the processor onto one or more of the M-bit wide parallel outputs.

7. The loopback module as recited in claim 1, further comprising First In First Out buffers (FIFOs) coupled between the serial to parallel converters and the crossbar switch or coupled between the crossbar switch and the parallel to serial converters to store data during Input/Output (I/O) speed mismatches.

8. The loopback module as recited in claim 1, further comprising a clock/data recovery circuit coupled to each serial to parallel converter for receiving the HSS input and separating an embedded clock from the data.

9. The loopback module as recited in claim 1, the crossbar switch implemented in standard digital logic for reducing loading effects.

10. The loopback module as recited in claim 1, the one or more serial to parallel converters and the one or more parallel to serial converters implemented in standard digital logic for reducing chip pin counts.

11. The loopback module as recited in claim 1, contained within a single Field Programmable Gate Array (FPGA).

12. The loopback module as recited in claim 11, wherein the FPGA forms part of a test site.

13. The loopback module as recited in claim 12, wherein the test site forms part of a test system.

14. A method for providing a loopback path for testing a Device Under Test (DUT), comprising:
   receiving one or more High Speed Serial (HSS) inputs;
   converting M sequential serial bits of one or more of the HSS inputs into M-bit wide parallel inputs;
   selectively routing a plurality of the M-bit wide parallel inputs to an M-bit wide parallel output; and
   converting the M-bit wide parallel output to M sequential serial bits of a HSS output.

15. The method as recited in claim 14, further comprising injecting jitter into one or more of the HSS outputs.

16. The method as recited in claim 14, further comprising selectively switching M-bit wide parallel memory data onto one or more of the M-bit wide parallel outputs, or storing an M-bit wide parallel input into the memory.

17. The method as recited in claim 14, further comprising generating M-bit wide parallel Pseudo Random Bit Stream (PRBS) data and switching the M-bit wide parallel PRBS data onto one or more of the M-bit wide parallel outputs.

18. The method as recited in claim 17, further comprising generating the M-bit wide parallel PRBS data from an M-bit wide seed.

19. The method as recited in claim 14, further comprising switching M-bit wide parallel processor data onto one or more of the M-bit wide parallel outputs.

20. The method as recited in claim 14, further comprising storing M-bit wide parallel input data or M-bit wide parallel output data into First In First Out buffers (FIFOs) during Input/Output (I/O) speed mismatches.

21. The method as recited in claim 14, further comprising receiving the one or more HSS inputs and separating an embedded clock from data in one or more of the HSS inputs.

22. The method as recited in claim 14, further comprising selectively routing one or more of the M-bit wide parallel inputs to one or more M-bit wide parallel outputs in standard digital logic.

23. The method as recited in claim 14, further comprising converting the M sequential serial bits of one or more of the HSS inputs into M-bit wide parallel inputs in standard digital logic, and converting each of the one or more M-bit wide parallel outputs to M sequential serial bits of an HSS output in standard digital logic.

24. The method as recited in claim 14, implemented within a single Field Programmable Gate Array (FPGA).

25. The method as recited in claim 24, further comprising employing the FPGA within a test site.

26. The method as recited in claim 25, further comprising employing the test site within a test system.

27. A method for providing a loopback path for testing a Device Under Test (DUT), comprising:
   receiving one or more High Speed Serial (HSS) inputs;
   reducing device speeds of subsequent processing logic by converting M sequential serial bits of each of the one or more HSS inputs into M-bit wide parallel inputs;
   selectively routing a plurality of the M-bit wide parallel inputs to an M-bit wide parallel output at the reduced device speeds; and
   regenerating an HSS output from the M-bit wide parallel output by converting the M-bit wide parallel output to M sequential serial bits of the HSS output.

28. The method as recited in claim 27, fUrther comprising generating M-bit wide parallel Pseudo Random Bit Stream (PRBS) data at the reduced device speeds and switching the M-bit wide parallel PRBS data onto one or more of the M-bit wide parallel outputs.

29. The method as recited in claim 27, further comprising reducing loading effects by selectively routing one or more of the M-bit wide parallel inputs to one or more M-bit wide parallel outputs using standard digital logic.

30. The method as recited in claim 27, further comprising reducing chip pin counts by converting the M sequential serial bits of the one or more HSS inputs into M-bit wide parallel inputs and converting each of the one or more M-bit wide parallel outputs to M sequential serial bits of HSS outputs within a single Field Programmable Gate Array (FPGA).

31. A loopback module for testing a Device Under Test (DUT), comprising:
   one or more serial to parallel converters, each serial to parallel converter for receiving a High Speed Serial (HSS) input and converting M sequential serial bits of the HSS input into an M-bit wide parallel input;
   one or more parallel to serial converters, each parallel to serial converter for receiving an M-bit wide parallel output and converting the M-bit wide parallel output to M sequential serial bits of an HSS output;
   a crossbar switch coupled between the one or more serial to parallel converters and the one or more parallel to serial converters for routing any M-bit wide parallel input to one or more M-bit wide parallel outputs;
   a parallel Pseudo Random Bit Stream (PRBS) generator coupled to the crossbar switch, the crossbar switch for switching M-bit wide parallel PRBS data from the PRBS generator onto one or more of the M-bit wide parallel outputs; and
   an M-bit wide seed input coupled to the PRBS generator for starting the PRBS generator at a known time.

32. A method for providing a loopback path for testing a Device Under Test (DUT), comprising:
   receiving one or more High Speed Serial (HSS) inputs;
   converting M sequential serial bits of one or more of the HSS inputs into M-bit wide parallel inputs;
   selectively routing one or more of the M-bit wide parallel inputs to one or more M-bit wide parallel outputs;
   converting one or more of the M-bit wide parallel outputs to M sequential serial bits of a HSS output;
   generating M-bit wide parallel Pseudo Random Bit Stream (PRBS) data and switching the M-bit wide parallel PRBS data onto one or more of the M-bit wide parallel outputs; and
   generating the M-bit wide parallel PRBS data from an M-bit wide seed.

* * * * *